(12) United States Patent
Gupta et al.

(10) Patent No.: US 9,664,214 B1
(45) Date of Patent: May 30, 2017

(54) PORTABLE UNIVERSAL MOUNTING DEVICE

(71) Applicants: Anjum K Gupta, San Diego, CA (US); Emmanuel Pun, San Diego, CA (US)

(72) Inventors: Anjum K Gupta, San Diego, CA (US); Emmanuel Pun, San Diego, CA (US)

(*) Notice: Subject to any disclaimer, the term of this patent is extended or adjusted under 35 U.S.C. 154(b) by 0 days.

(21) Appl. No.: 15/130,801

(22) Filed: Apr. 15, 2016

(51) Int. Cl.
*F16B 2/10* (2006.01)
*F16B 2/00* (2006.01)
*F16M 13/02* (2006.01)
*G06F 1/16* (2006.01)
*H04M 1/04* (2006.01)
*G03B 17/56* (2006.01)

(52) U.S. Cl.
CPC ............. *F16B 2/10* (2013.01); *F16B 2/005* (2013.01); *F16M 13/02* (2013.01); *G03B 17/561* (2013.01); *G06F 1/1633* (2013.01); *H04M 1/04* (2013.01)

(58) Field of Classification Search
CPC  F16B 2/10; F16B 2/005; F16M 13/02; G03B 17/561; H04M 1/04; A47B 23/00; A47B 23/043; A47B 23/042
USPC .......... 248/274.1, 441.1, 448, 451, 452, 453
See application file for complete search history.

(56) References Cited

U.S. PATENT DOCUMENTS

| | | | | |
|---|---|---|---|---|
| 6,966,533 B1* | 11/2005 | Kalis | ................... | B60R 11/0241 248/279.1 |
| 7,918,427 B2* | 4/2011 | Wang | ..................... | F16M 13/00 248/278.1 |
| 8,066,241 B2* | 11/2011 | Yu | .......................... | F16M 11/04 248/286.1 |
| 8,112,924 B2* | 2/2012 | Longobardo | ............. | G09F 7/20 248/298.1 |
| 8,235,334 B1* | 8/2012 | Kobal | ................... | F16M 11/041 248/122.1 |
| 8,240,628 B2* | 8/2012 | Huang | ................... | F16M 11/04 248/122.1 |
| 8,469,325 B2* | 6/2013 | Yu | .......................... | G10G 5/005 248/231.51 |
| 8,544,161 B2* | 10/2013 | Carnevali | ........... | B60R 11/0235 248/346.04 |
| 8,864,089 B2* | 10/2014 | Hung | ................... | F16M 11/041 248/122.1 |
| 8,905,367 B2* | 12/2014 | Bury | ....................... | B60R 11/02 224/929 |
| 9,133,982 B1* | 9/2015 | Valdez | ................. | F16M 13/022 |

* cited by examiner

Primary Examiner — Anita M King (57) ABSTRACT

The disclosure provides a universal mounting device and method for mounting a hand-held portable electronic device on the universal mounting device. The universal mounting device includes two gripping members that rotate around a center pivot. Each end of the gripping members includes a non-slip gripping finger for a total of four fingers that clamps onto and secures the electronic device. A threaded rod is used for applying pressure onto the electronic device through the gripping members and non-slip fingers. A knob attached to one end of the threaded rod is used to rotate the threaded rod. Twisting the knob turns the threaded rod that pushes a bar spanning the two gripping members. The two ends of the spanning bar slide along each of the gripping members, forcing them to tighten or loosen the grip on the electronic device fitted between the non-slip fingers.

10 Claims, 7 Drawing Sheets

PORTABLE UNIVERSAL MOUNTING DEVICE

FIELD OF THE INVENTION

The present invention relates generally to a clamping apparatus for mounting portable devices, and in particular to a screw mechanism driven clamping apparatus for portable phones, iPads, small cameras, and other hand-held portable electronic devices.

BACKGROUND OF THE INVENTION

Mounting devices are known for mounting portable hand-held electronic devices such as portable phones, iPads, small cameras, and other devices onto various mounting surfaces. Conventional mounting devices for a mobile phone or device typically includes a seat with fixed walls, which secures the device in place. However, this type of mounting device suffers from several disadvantages, such as a seat and walls that can only accommodate certain types or sizes of devices. Consequently, when the user changes the type of electronic device, they will need to purchase another mounting device. Furthermore, attaching and detaching mechanisms of most mounting devices are quite complex and complicated, and the user often spends a great deal of time attaching or detaching the device. Finally, most mounting devices are not portable and can only be used in one location, for example, inside of a vehicle.

For all these reasons there remains a need in the art for a portable universal mounting device for portable hand-held electronic devices.

SUMMARY OF THE INVENTION

The disclosure provides a universal mounting device and method thereof, for mounting a hand-held portable electronic device.

In one embodiment, the disclosure provides a universal mounting device for a portable hand-held electronic device, which includes:

two substantially rigid gripping members, each of the two substantially rigid gripping members crisscrossed and pivotably mounted to a pivot body, the two substantially rigid gripping members further including a sliding slot in a distal end of each of the two substantially rigid gripping members, and distal non-slip fingers on each end of the two substantially rigid gripping members;

a spanning bar equipped with a slot pin on each end of the spanning bar, each of the slot pins inserted into and tracked along each one of the respective sliding slots; and a threaded rod connected to a knob on a proximal end of the rod, and inserted through a tapped hole in the pivot body, the threaded rod connected to the spanning bar on a distal end of the rod, the knob and threaded rod for biasing the two substantially rigid gripping members and non-slip fingers for grasping or releasing the electronic device.

In one aspect, the disclosure provides the universal mounting device, further including the two substantially rigid gripping members crisscrossed in a substantially X-shaped configuration.

In another aspect, the disclosure provides the universal mounting device, further including an attaching point connected to the pivot body, wherein the attaching point allows the universal mounting device to be mounted to any suitable support stand or surface.

In another aspect, the disclosure provides the universal mounting device, further including a covering of rubber or any other resiliently compressible elastomeric material suitable on the non-slip fingers for protecting the electronic device from scratching while providing a high friction surface suitable for resisting any tendency for the electronic device to slide from between the non-slip fingers.

In another aspect, the disclosure provides the universal mounting device, further including a pivot screw or peg attached to the pivot body, wherein the two substantially rigid gripping members are pivotably mounted to the pivot screw or peg.

In another aspect, the disclosure provides the universal mounting device, further including a substantially parallel sliding slot in each of the two substantially rigid gripping members, each of the parallel sliding slots having a proximal portion and a distal portion.

In another aspect, the disclosure provides the universal mounting device, further including the two substantially rigid gripping members in a contracted state, wherein each of the slot pins, inserted into and tracked along each one of the respective substantially parallel sliding slots, are located at a proximal portion of the sliding slots.

In another aspect, the disclosure provides the universal mounting device, further including the two substantially rigid gripping members in an expanded state, wherein each of the slot pins, inserted into and tracked along each one of the respective substantially parallel sliding slots, are located at a distal portion of the sliding slots.

In another embodiment, the disclosure provides a method of mounting a portable hand-held electronic device on a universal mounting device, the method including:

inserting the electronic device in between distal non-slip fingers on each end of the two substantially rigid gripping members of the universal mounting device; and turning a knob in a forward or right-handed direction for a right threaded rod of the universal mounting device until the non-slip fingers grasp the electronic device, wherein the universal mounting device for a portable hand-held electronic device includes:

two substantially rigid gripping members, each of the two substantially rigid gripping members crisscrossed and pivotably mounted to a pivot body, the two substantially rigid gripping members further including a sliding slot in a distal end of each of the two substantially rigid gripping members, and distal non-slip fingers on each end of the two substantially rigid gripping members;

a spanning bar equipped with a slot pin on each end of the spanning bar, each of the slot pins inserted into and tracked along each one of the respective sliding slots; and a threaded rod connected to a knob on a proximal end of the rod, and inserted through a tapped hole in the pivot body, the threaded rod connected to the spanning bar on a distal end of the rod, the knob and threaded rod for biasing the two substantially rigid gripping members and non-slip fingers for grasping or releasing the electronic device.

In another aspect, the disclosure provides the method of mounting a portable hand-held electronic device on a universal mounting device, the method including:

turning the knob in a reverse or left-handed direction for a right threaded rod of the universal mounting device until the non-slip fingers release the electronic device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Although the following discussion is directed toward use of the present invention in conjunction with a hand-held portable phone, aka a mobile device, those skilled in the art will recognize that the present invention may be utilized to securely mount a wide variety of similar articles at a convenient location, for example, iPads, small cameras, and other hand-held portable electronic devices. Thus, discussion of the present invention in conjunction with a hand-held portable phone is by way of example only and not by way of limitation.

Several detailed illustrative embodiments of the present device and method of clamping a portable hand-held electronic device is disclosed herein. However, techniques, systems and operating structures in accordance with the present device and method of clamping a portable hand-held electronic device may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present device and method of clamping a portable hand-held electronic device. The following presents a detailed description of an illustrative embodiment (as well as some alternative embodiments) of the present device and method of clamping a portable hand-held electronic device.

Embodiments of the present invention of a device and method of clamping a portable hand-held electronic device are illustrated in FIGS. 1-7 of the drawings. In the Figures, like numerals indicate like elements.

The disclosure provides a universal mounting device and method for mounting a hand-held portable electronic device on the universal mounting device. The universal mounting device includes two gripping members that rotate around a center pivot. Each end of the gripping members includes a non-slip gripping finger for a total of four fingers that clamps onto and secures the electronic device. A threaded rod is used for applying pressure onto the electronic device through the gripping members and non-slip fingers. A knob attached to one end of the threaded rod is used to rotate the threaded rod. Twisting the knob turns the threaded rod that pushes a bar spanning the two gripping members. The two ends of the spanning bar slide along each of the gripping members, forcing them to tighten or loosen the grip on the electronic device fitted between the non-slip fingers.

The universal mounting device and method for mounting a hand-held portable electronic device on the universal mounting device provides both security and flexibility. The threaded rod mechanism exerts a good amount of force on the gripping members and non-slip fingers, which provides a firm grip on the electronic device allowing the electronic device to be placed in either a horizontal or vertical position as shown in FIGS. 1-7.

Figure 1:
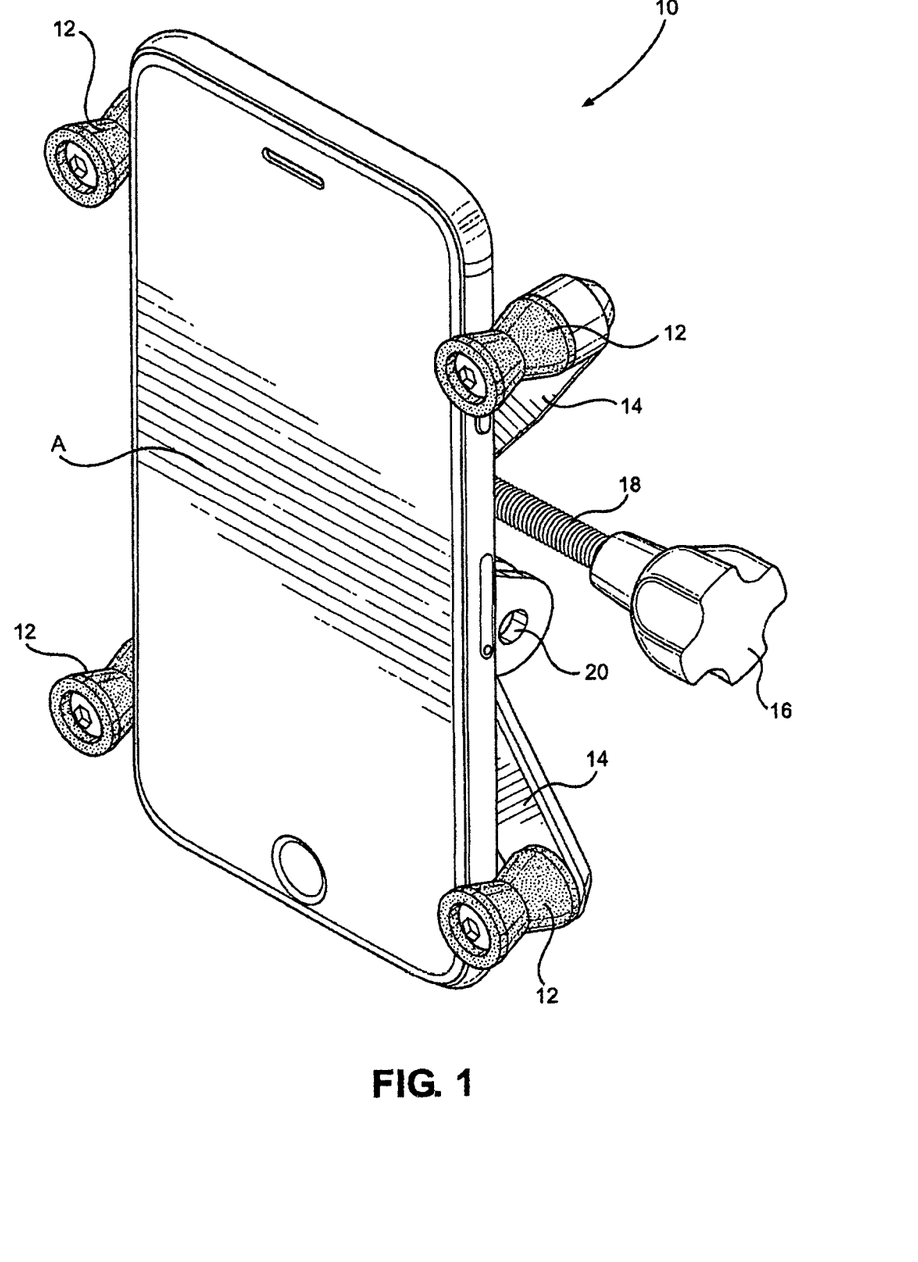
FIG. 1 illustrates an embodiment of a front view of a portable universal mounting device equipped with a vertical hand-held portable electronic device.

Referring now to FIG. 1, an embodiment of a front view of a portable universal mounting device 10 equipped with a vertical hand-held portable electronic device A is illustrated. The mounting device 10 includes non-slip fingers 12, gripping members 14, a knob 16, a threaded rod 18, and an attaching point 20.

The mounting device 10 can be made of any suitable material, for example, metal, plastic, wood, composite material, or a combination thereof, and can be mounted to any suitable surface or can be mounted to any suitable support stand or surface through its attaching point 20. Examples of suitable support stands and/or surfaces can be found in, for example, U.S. patent application publication serial number 2011/0095159 A1, the disclosure of which is incorporated herein by reference.

The mounting device 10 is designed for releasably clamping device A through a screw mechanism. For example, as shown in FIG. 1 mounting device 10 includes two substantially rigid gripping members 14, which extend and contract through a screw mechanism to grasp and release device A through two pairs of substantially upright non-slip fingers 12. Non-slip fingers 12 optionally include, or may be covered by, rubber or any other resiliently compressible elastomeric material suitable for protecting the device A from scratching, while providing a high friction surface suitable for resisting any tendency for the device A to slide from between non-slip fingers 12.

Figure 2:
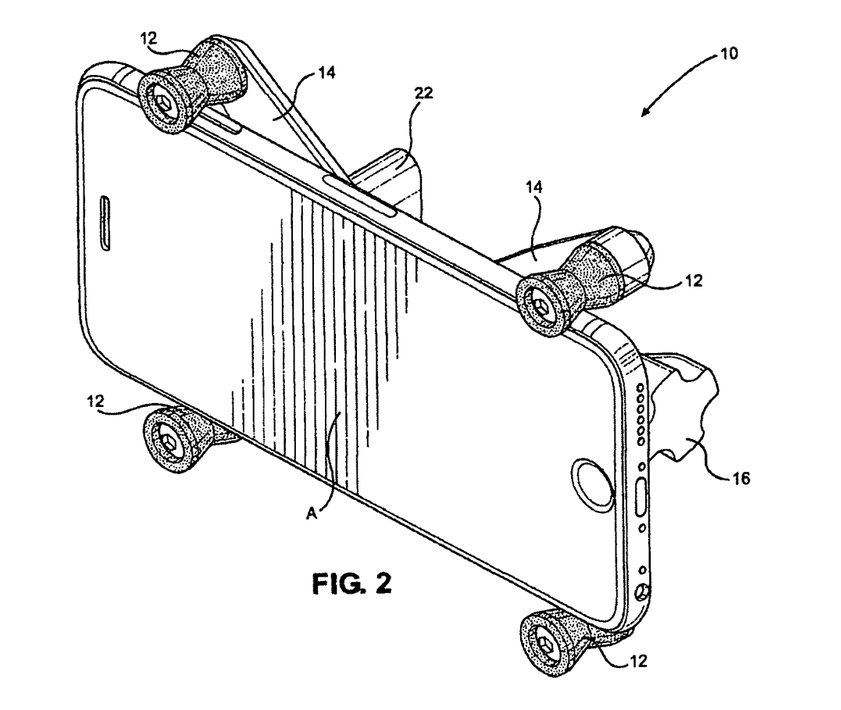
FIG. 2 illustrates an embodiment of a front view of a portable universal mounting device equipped with a horizontal hand-held portable electronic device.

FIG. 2 illustrates an embodiment of a front view of the portable universal mounting device 10 equipped with a horizontal hand-held portable electronic device A. As described above, the mounting device 10 includes non-slip fingers 12, gripping members 14, and a knob 16. Also shown is a spanning bar 22, in which the threaded rod 18 (shown in FIG. 1) engages to allow the gripping members 14 to contract and/or extend through a screw mechanism to grasp and release device A.

Figure 3:
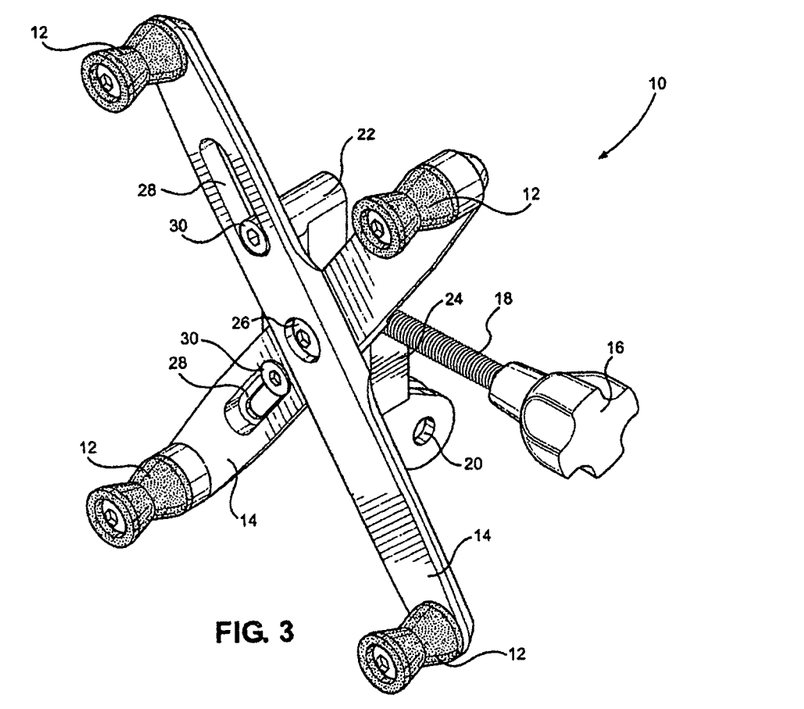
FIG. 3 illustrates an embodiment of a front view of a contracted portable universal mounting device.

FIG. 3 illustrates an embodiment of a front view of the portable universal mounting device 10 in a contracted state. As shown, the mounting device 10 includes non-slip fingers 12, a pair of gripping members 14, a knob 16, a threaded rod 18, and an attaching point 20 connected to a pivot body 24. The knob 16 and threaded rod 18 are connected to the spanning bar 22 through the pivot body 24. Gripping members 14 are arranged in a crisscrossed pattern, i.e., an X-shaped configuration, centered around and attached at the pivot point through a pivot screw or peg 26, which is anchored and/or attached to and/or inserted into pivot body 24. Each gripping member 14 includes a sliding slot 28 at one end, which runs parallel with each respective gripping member 14. Spanning bar 22 further includes a pair of slot pins 30, each of which inserts into and tracks along one of the respective sliding slots 28. Accordingly, when gripping members 14 are in a fully contracted state as shown in FIG. 3, the slot pins 30 are located at a proximal portion of the sliding slots 28.

Figure 4:
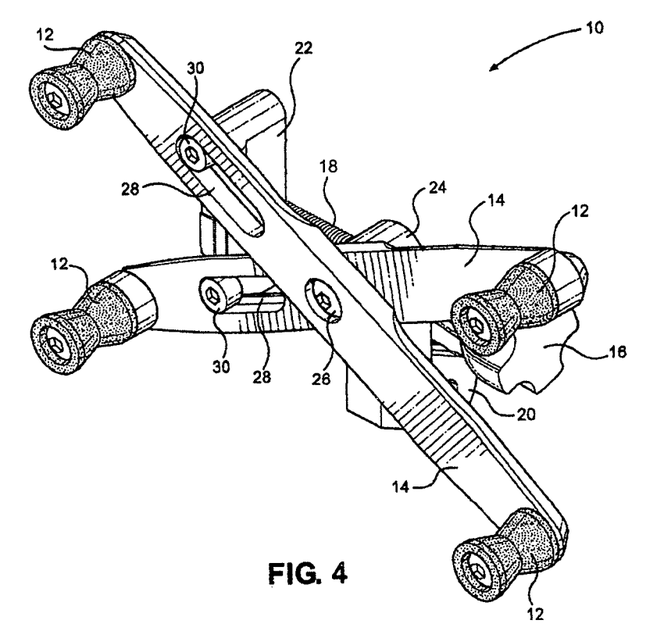
FIG. 4 illustrates an embodiment of a front view of an expanded portable universal mounting device.

FIG. 4 illustrates an embodiment of a front view of the portable universal mounting device 10 in an expanded state.

As shown, the mounting device 10 includes non-slip fingers 12, a gripping members 14, a knob 16, a threaded rod 18, an attaching point 20, a spanning bar 22, a pivot body 24, a pivot screw or peg 26, sliding slots 28, and slot pins 30. By contrast, when gripping members 14 are in a fully extended state as shown in FIG. 4, the slot pins 30 are located at a distal portion of the sliding slots 28.

Figure 5:
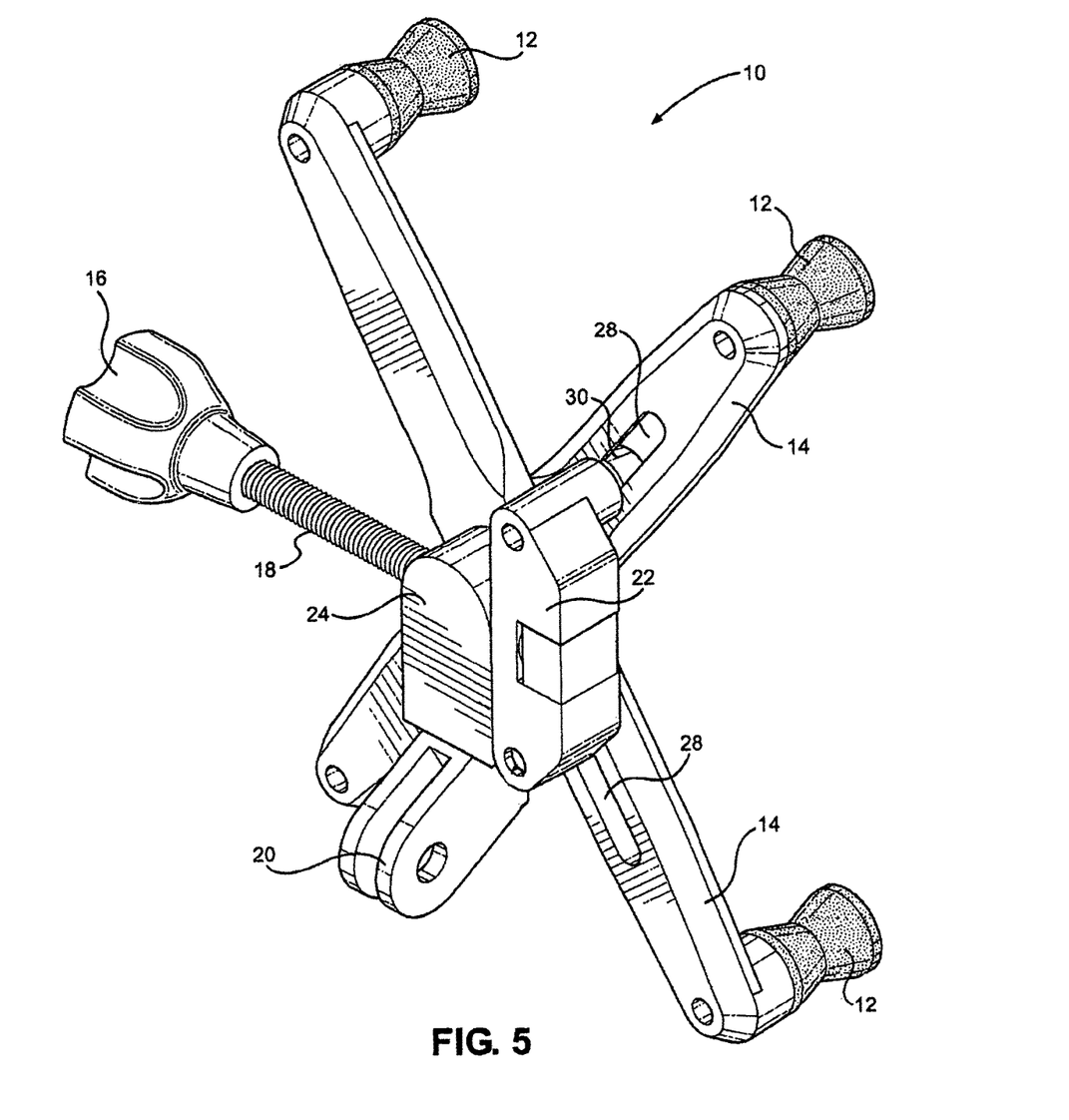
FIG. 5 illustrates an embodiment of a rear view of a contracted portable universal mounting device.

FIG. 5 illustrates an embodiment of a rear view of a portable universal mounting device 10 in a contracted state. As shown, the mounting device 10 includes non-slip fingers 12, gripping members 14, a knob 16, a threaded rod 18, and an attaching point 20. The knob 16 and threaded rod 18 are connected to the spanning bar 22 through a tapped hole (not shown) in the pivot body 24. Each gripping member 14 includes a sliding slot 28 at one end, which runs parallel with each respective gripping member 14. Spanning bar 22 further includes a pair of slot pins 30, each of which inserts into and tracks along one of the respective sliding slots 28. Accordingly, when gripping members 14 are in a fully contracted state, by turning the knob 16 and threaded rod 18 in a reverse or left-handed direction (e.g., for a right threaded rod 18 and pivot body 24) as shown in FIG. 5, the pivot body 24 and the spanning bar 22 are close to each other, and the slot pins 30 are located at a proximal portion of the sliding slots 28.

Figure 6:
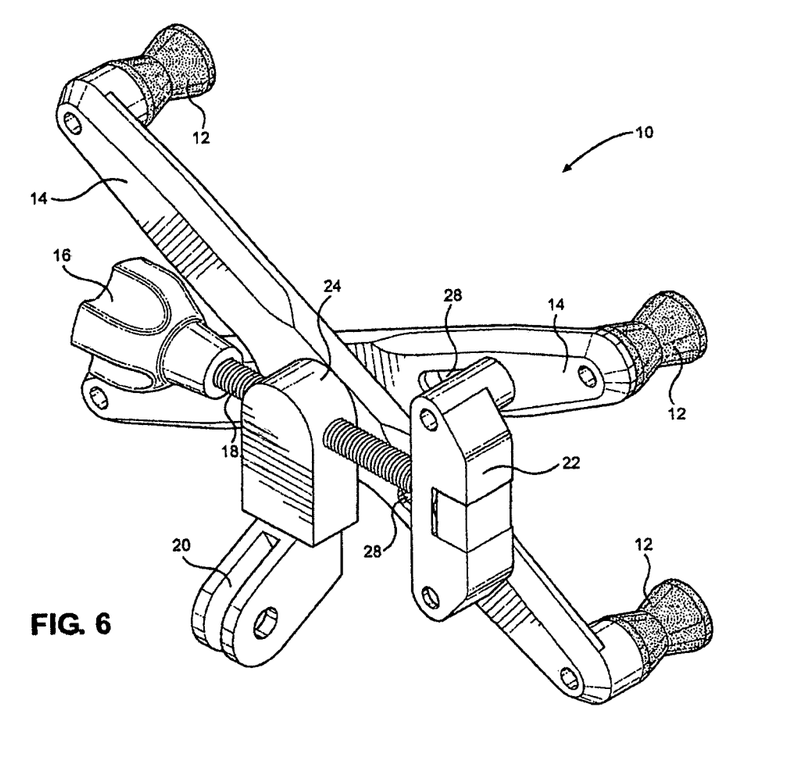
FIG. 6 illustrates an embodiment of a rear view of an expanded portable universal mounting device.

FIG. 6 illustrates an embodiment of a rear view of a portable universal mounting device 10 in an expanded state. As shown, the mounting device 10 includes non-slip fingers 12, gripping members 14, a knob 16, a threaded rod 18, and an attaching point 20. The knob 16 and threaded rod 18 are connected to the spanning bar 22 through a tapped hole (not shown) in the pivot body 24. Each gripping member 14 includes a sliding slot 28 at one end, which runs parallel with each respective gripping member 14. Spanning bar 22 further includes a pair of slot pins 30, each of which inserts into and tracks along one of the respective sliding slots 28. Accordingly, when gripping members 14 are in a fully expanded state, by turning the knob 16 and threaded rod 18 in a forward or right-handed direction (e.g., for a right threaded rod 18 and pivot body 24) as shown in FIG. 6, the pivot body 24 and the spanning bar 22 are apart from each other, and the slot pins 30 are located at a distal portion of the sliding slots 28.

Figure 7:
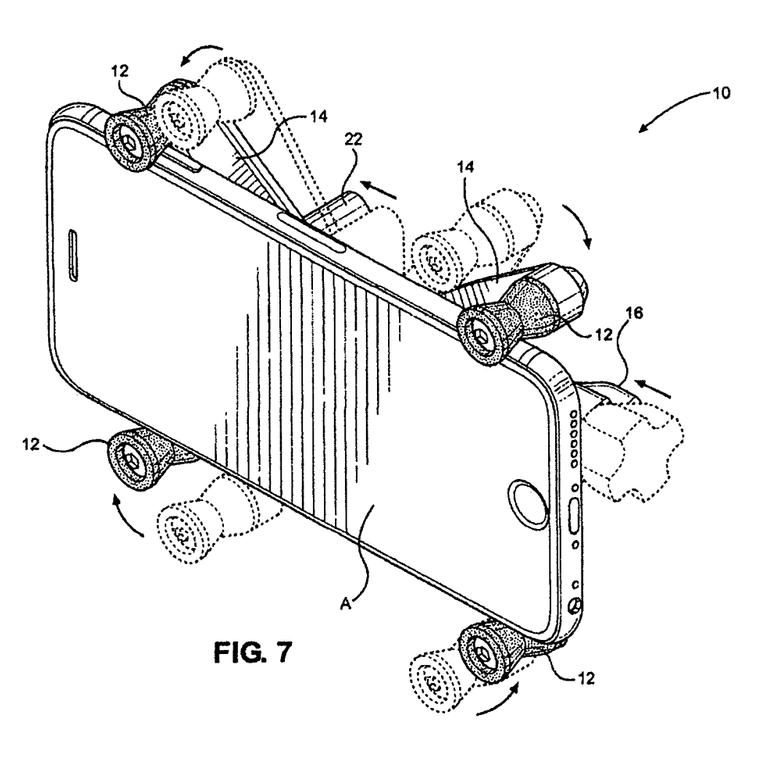
FIG. 7 illustrates an embodiment of a front view of a portable universal mounting device equipped with a horizontal hand-held portable electronic device.

FIG. 7 illustrates an embodiment of a front view of the portable universal mounting device 10 equipped with a horizontal hand-held portable electronic device A. As described above, the mounting device 10 includes non-slip fingers 12, gripping members 14, and a knob 16. Also shown is a spanning bar 22, in which the threaded rod 18 (shown in FIG. 1) engages to allow the gripping members 14 to contract and/or extend through a screw mechanism to grasp and release device A. When the knob 16 is turned in a reverse or left-handed direction (e.g., for a right threaded rod 18 and pivot body 24) as shown in FIG. 5, the spanning bar 22 is pulled forwards and the gripping members 14 and non-slip fingers 12 release device A; and when the knob 16 is turned in a forward or right-handed direction (e.g., for a right threaded rod 18 and pivot body 24) as shown in FIG. 6, the spanning bar 22 is pushed away and the gripping members 14 and non-slip fingers 12 grasp device A. Similar mechanisms are involved for a portable universal mounting device 10 equipped with a vertical hand-held portable electronic device A.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention.

What is claimed is:

1. A universal mounting device for a portable hand-held electronic device, comprising:
   two substantially rigid gripping members, each of the two substantially rigid gripping members crisscrossed and pivotably mounted to a pivot body, the two substantially rigid gripping members further including a sliding slot in a distal end of each of the two substantially rigid gripping members, and distal non-slip fingers on each end of the two substantially rigid gripping members;
   a spanning bar equipped with a slot pin on each end of the spanning bar, each of the slot pins inserted into and tracked along each one of the respective sliding slots; and
   a threaded rod connected to a knob on a proximal end of the rod, and inserted through a tapped hole in the pivot body, the threaded rod connected to the spanning bar on a distal end of the rod, the knob and threaded rod for biasing the two substantially rigid gripping members and non-slip fingers for grasping or releasing the electronic device.

2. The universal mounting device of claim 1, further comprising the two substantially rigid gripping members crisscrossed in a substantially X-shaped configuration.

3. The universal mounting device of claim 1, further comprising an attaching point connected to the pivot body, wherein the attaching point allows the universal mounting device to be mounted to any suitable support stand or surface.

4. The universal mounting device of claim 1, further comprising a covering of rubber or any other resiliently compressible elastomeric material suitable on the non-slip fingers for protecting the electronic device from scratching while providing a high friction surface suitable for resisting any tendency for the electronic device to slide from between the non-slip fingers.

5. The universal mounting device of claim 1, further comprising a pivot screw or peg attached to the pivot body, wherein the two substantially rigid gripping members are pivotably mounted to the pivot screw or peg.

6. The universal mounting device of claim 1, wherein each of the sliding slots have a proximal portion and a distal portion.

7. The universal mounting device of claim 6, further comprising the two substantially rigid gripping members in a contracted state, wherein each of the slot pins, inserted into and tracked along each one of the respective sliding slots, are located at a proximal portion of the sliding slots.

8. The universal mounting device of claim 6, further comprising the two substantially rigid gripping members in an expanded state, wherein each of the slot pins, inserted into and tracked along each one of the respective sliding slots, are located at a distal portion of the sliding slots.

9. A method of mounting a portable hand-held electronic device on a universal mounting device, the method comprising:
   inserting the electronic device in between distal non-slip fingers on each end of two substantially rigid gripping members of the universal mounting device; and
   turning a knob in a forward or right-handed direction for a right threaded rod of the universal mounting device until the distal non-slip fingers grasp the electronic device, wherein the universal mounting device for the portable hand-held electronic device comprises:

two substantially rigid gripping members, each of the two substantially rigid gripping members criss-crossed and pivotably mounted to a pivot body, the two substantially rigid gripping members further including a sliding slot in a distal end of each of the two substantially rigid gripping members, and the distal non-slip fingers on each end of the two substantially rigid gripping members;

a spanning bar equipped with a slot pin on each end of the spanning bar, each of the slot pins inserted into and tracked along each one of the respective sliding slots; and the right threaded rod connected to the knob on a proximal end of the rod, and inserted through a tapped hole in the pivot body, the right threaded rod connected to the spanning bar on a distal end of the rod, the knob and the right threaded rod for biasing the two substantially rigid gripping members and the distal non-slip fingers for grasping or releasing the electronic device.

10. The method of claim 9, the method further comprising:

turning the knob in a reverse or left-handed direction for a right threaded rod of the universal mounting device until the non-slip fingers release the electronic device.

* * * * *